US012609533B2

(12) United States Patent (10) Patent No.: US 12,609,533 B2

Spahic et al. (45) Date of Patent: Apr. 21, 2026

(54) MEDIUM VOLTAGE ARRANGEMENT OF SOLAR MODULES AND POWER CONVERTER

(71) Applicant: Innomotics GmbH, Nuremberg (DE)

(72) Inventors: Ervin Spahic, Erlangen (DE); Lennart Baruschka, Wedemark (DE)

(73) Assignee: Innomotics GmbH, Nuremberg (DE)

( * ) Notice: Subject to any disclaimer, the term of this patent is extended or adjusted under 35 U.S.C. 154(b) by 0 days.

(21) Appl. No.: 18/689,700

(22) PCT Filed: Jul. 18, 2022

(86) PCT No.: PCT/EP2022/069996

§ 371 (c)(1),
(2) Date: Mar. 6, 2024

(87) PCT Pub. No.: WO2023/041222

PCT Pub. Date: Mar. 23, 2023

(65) Prior Publication Data

US 2024/0396341 A1 Nov. 28, 2024

(30) Foreign Application Priority Data

Sep. 16, 2021 (EP) ..................................... 21197189

(51) Int. Cl.
*H02J 3/38* (2006.01)
*H02J 3/46* (2006.01)
*H02S 40/36* (2014.01)

(52) U.S. Cl.
CPC ................ *H02J 3/381* (2013.01); *H02J 3/46* (2013.01); *H02S 40/36* (2014.12); *H02J 2300/24* (2020.01)

(58) Field of Classification Search
CPC .............. H02J 3/381; H02J 3/46; H02S 40/36
See application file for complete search history.

(56) References Cited

U.S. PATENT DOCUMENTS

2006/0275168 A1 12/2006 Rakowski et al.
2011/0266876 A1* 11/2011 Lauinger ................... H02J 1/00
307/71

(Continued)

FOREIGN PATENT DOCUMENTS

EP 1 941 070 A2 7/2008
EP 2 386 121 81 6/2010

(Continued)

OTHER PUBLICATIONS

Redi Paolo et al: "Considerations About the Design of PV Modules for Central Power Plants", Tenth E.C. Photovoltaic Solar Energy Conference. Proceedings of the International Conference; Apr. 8-12, 1991; Lisbon, Portugal; [Proceedings of the International Photovoltaic Solar Energy Conference], Dordrecht, Kluwer Academic Publishers, NL, Bd. Conf. 10, Apr. 8, 1991 (Apr. 8, 1991), Seiten 959-962, XP001135866, ISBN: 978-0-7923-1389-2.

(Continued)

*Primary Examiner* — Tae-Sik Kang
(74) *Attorney, Agent, or Firm* — Henry M. Feiereisen LLC

(57) ABSTRACT

A solar group unit includes at least two solar units. Each of the solar unit includes plurality of solar modules which are each arranged in a carrier unit. A connecting point to an electrical connection is arranged between two of the solar modules that are arranged in a series circuit. The carrier unit is at least partially electrically conductive and is electrically conductively connected to the connection point. The solar units are arranged electrically in series in order to transmit the generated electrical power. The carrier units of the respective solar modules are arranged such as to be electrically insulated from one another by an insulator which is embodied as a component.

7 Claims, 5 Drawing Sheets

(56)           References Cited

U.S. PATENT DOCUMENTS

| | | | |
|---|---|---|---|
| 2014/0102531 A1* | 4/2014 | Moslehi | H10F 19/85 |
| | | | 136/256 |
| 2017/0298485 A1 | 10/2017 | Sawada et al. | |
| 2018/0216215 A1 | 8/2018 | Hirata et al. | |

FOREIGN PATENT DOCUMENTS

| | | |
|---|---|---|
| EP | 3 318 650 A1 | 5/2018 |
| JP | 2009256748 A | 11/2009 |

OTHER PUBLICATIONS

Araneo Rodolfo et al: "On the Insulation Resistance in High-Power Free-Field Grid Connected Photovoltaic Plants", 2019 IEEE International Conference on Environment and Electrical Engineering and 2019 IEEE Industrial and Commercial Power Systems Europe (EEEIC / I &CPS Europe), IEEE, Jun. 11, 2019 (Jun. 11, 2019), Selten 1-6, XP033587490, DOI: 10.1109/EEEIC.2019.8783919 [gefunden am Jul. 31, 2019].
PCT International Search Report and Written Opinion of International Searching Authority mailed Nov. 22, 2022 corresponding to PCT International Application No. PCT/EP2022/069996 filed Jul. 18, 2022.

* cited by examiner

MEDIUM VOLTAGE ARRANGEMENT OF SOLAR MODULES AND POWER CONVERTER

CROSS-REFERENCES TO RELATED APPLICATIONS

This application Is the U.S. National Stage of International Application No. PCT/EP2022/069996, filed Jul. 18, 2022, which designated the United States and has been published as International Publication No. WO 2023/041222 A1 and which claims the priority of European Patent Application, Serial No. 21197189.0, filed Sep. 16, 2021, pursuant to 35 U.S.C. 119 (a)-(d).

BACKGROUND OF THE INVENTION

The invention relates to a solar unit, having a large number of solar modules and a carrier unit, wherein in respect of its insulation resistance, the solar modules have an insulating DC voltage, in particular an insulating DC voltage of up to 1.5 kV DC. The invention also relates to a solar group unit, wherein the solar group unit has at least two solar units of this kind, wherein in respect of their first connectors and second connectors, the solar units are arranged electrically in series. Further, the invention relates to a solar generating unit, having a power converter and at least solar unit of this kind and/or at least one solar group unit of this kind. The invention relates, moreover, to a solar generating system, having at least one solar generating unit of this kind, a grid connecting point for connection of the solar generating unit to a power grid and a transformer. Furthermore, the invention relates to a method for feeding electrical power into a power grid by means of a solar unit of this kind, a solar group unit of this kind, a solar generating unit of this kind or a solar generating system of this kind.

Solar modules, also referred to as photovoltaic (PV) modules or photovoltaic panels, are connected in series in order to generate electrical power from sunlight, so the voltage of the modules add up. A plurality of solar modules connected in series form a PV string. The voltage of PV strings is currently in the region of several hundred volts' DC voltage. The housing of the PV panels or their frames/mounts are grounded.

One or more PV string(s) is/are connected to one or more power converter(s), which generate(s) an AC low voltage from the DC voltage of the solar modules at its respective output and then provides it at the grid connection (typically 0.4-0.69 kV). The point at which the connection to the grid occurs is also referred to as the grid connecting point.

The solar modules have an insulation resistance. This is an electrical insulation resistance between the electrical connectors of the solar module at which the electrical power generated from sunlight is available, and the housing of the solar module or a carrier unit on or at which the solar modules, in particular the housings of these solar modules, are arranged. The insulation resistance is specified by a voltage, which can be present between the electrical connectors of the solar module and the housing or the carrier unit without a current flow, or appreciable current flow, or damage to the modules occurring. The maximum DC voltage, which may be present between one of the electrical connectors of the solar module and the housing or the carrier unit, is referred to as the insulating DC voltage. Typical insulating DC voltages of current solar modules are up to 1.5 kV DC.

The invention is based on the object of improving an arrangement for feeding solar power into a power grid, in particular for high outputs.

SUMMARY OF THE INVENTION

This object is achieved by a solar group unit, wherein the solar group unit has at least two solar units with a first connector and a second connector respectively, wherein the solar units have a large number of solar modules and a carrier unit respectively, wherein in respect of their insulation resistance, the solar modules have an insulating DC voltage, in particular an insulating DC voltage of up to 1.5 kV DC, wherein the solar modules are arranged in a series circuit between the first connector and the second connector, wherein a connecting point is arranged at an electrical connection between two of the solar modules arranged in the series circuit in such a way that the value of a first voltage which can be generated by the solar modules arranged between the first connector and the connecting point and the value of a second voltage which can be generated by the solar modules arranged between the second connector and the connecting point is in each case smaller than the insulating DC voltage, wherein the solar modules are arranged in or on the carrier unit, wherein the carrier unit is embodied to be at least partially electrically conductive and is electrically conductively connected to the connecting point, wherein in respect of their first connectors and second connectors, the solar units are arranged electrically in series, wherein the carrier units of the respective solar modules are arranged to be electrically insulated from one another by means of an insulator. The object is also achieved by a solar generating unit, having a power converter as well at least a solar group unit of this kind, wherein the power converter is embodied as a medium voltage power converter, and has a DC voltage side and an AC voltage side, wherein the solar unit and/or the solar group unit is electrically connected to the DC voltage side of the power converter. The object is also achieved by a solar generating system, having at least one solar generating unit of this kind, a grid connecting point for connection of the solar generating unit to a power grid and a transformer, wherein the transformer is connected to the AC voltage side of the power converter and to the grid connecting point. Further, this object is achieved by a method for feeding-in electrical power by means of a solar group unit of this kind, a solar generating unit of this kind or a solar generating system of this kind, wherein electrical power generated by the solar modules is fed into a power grid by means of an AC voltage in the medium voltage range.

Further advantageous embodiments of the invention are disclosed in the dependent claims.

The invention is based, inter alia, on the recognition that the arrangement of solar modules may be improved and advantageous arrangements result thereby for electrical energy generation with these solar modules. Advantages result by dispensing with the grounding of solar modules and/or their carrier units, in particular for PV parks, power generating plants based on PV modules therefore, with an output of more than 100 MW.

Between the first connector and the second connector, the solar unit has a series circuit of solar modules. The solar modules are arranged in a series circuit at their solar module connectors at which the electrical output generated from sunlight is available.

The electrical power generated from sunlight is made available, for example to a power grid, to electrical consumers or an energy store, by means of a medium voltage power converter. The medium voltage inverter converts the voltage of the solar modules into an AC voltage. In other words, the electrical power generated by the solar modules is processed by the medium voltage inverter in such a way that it can be transferred by means of an AC voltage. This AC voltage has a root medium square value or an amplitude of more than 1,000 V. By varying the voltage in amplitude and phase position, the medium voltage power converter can control or regulate the transfer of effective power and reactive power independently of one another. The solar modules are arranged on or in carrier units. These carrier units each form an electrical potential. This is insulated from the ground potential, for example by means of an insulator on the carrier unit, which will hereinafter be referred to as the carrier insulator to differentiate it from other isolators. The potential of the respective carrier unit is defined by means of the connecting point in the series circuit of solar modules. In other words, the electrical potential of the respective carrier units is electrically connected to the connecting point. Since the potentials of the respective carrier units differ as a result, the carrier units are each arranged to be insulated from one another. This can occur, for example, in each case by way of an insulator, with the insulator having an insulating voltage which is greater than or equal to double the insulating DC voltage of the solar modules. This insulator is then arranged between two of the carrier units. If the insulating voltage of the solar modules is, for example, 1.5 kV DC, the insulators, which are arranged between two carrier units, have an insulating voltage of at least 3 kV.

The insulators between the carrier units can ensure that the two carrier units connected by an insulator do not overshoot a predefined voltage from one another. This guarantees that the carrier insulators are not overloaded, that is to say loaded with an inadmissibly high voltage. The carrier insulators represent the electrical insulation of the solar modules from the exposed parts of the plant. A defect in the carrier insulators thus entails the risk of endangering people. Due to the insulators present between the carrier units, in the event of a fault the units would fail first owing to the lower insulating voltage compared to the carrier insulators. This failure can be reliably identified. The solar group unit can then be transferred into a safe state. For this purpose, for example, the voltages are reduced, individual solar modules are switched off or bypassed, or the solar group unit is switched off.

It has proven to be advantageous, moreover, to arrange a voltage limiter, such as a varistor, between the carrier units, parallel to the insulator. The trigger threshold of the varistor can then be set above the insulating voltage of the insulator, for example in the range of 1.1 to 1.3 times the insulating voltage. In the event of failure of the insulator, the two carrier units connected via this insulator then have a defined potential from one another. Further operation of the solar group unit is thereby possible.

For the case where double the operating voltage that occurs between the connectors of the series circuit is provided as the insulating voltage for the insulator between the carrier units, and the connecting point is arranged centrally in the series circuit, the solar group unit can still be operated at maximum output even in the event of failure of an insulator. At the same time, the contact protection is reliably ensured since the carrier insulators are not overloaded. At the same time, it is possible to configure the carrier insulators for the necessary insulation resistance. Since these carrier insulators not only have to have the insulating capacity but must also satisfy mechanical demands on the statics as well, they are rather expensive compared to the insulators between the carrier units. Due to the simultaneous use of insulators between the carrier units, the demands on the insulation resistance of the carrier insulation decrease considerably without impairing the protection against contact of the solar generating system or the solar generating unit.

The connecting point is arranged in the series circuit between two of the solar modules of the respective solar unit in such a way that the maximum voltage, which can be present between the connecting point and one of the electrical connectors, the first connector or the second connector therefore, of the respective solar unit is less than or equal to the insulating DC voltage of the solar modules. It is thereby possible to generate a series circuit of solar modules in a solar group unit, with the voltage of the series circuit of all solar modules of the solar group unit overshooting the insulating DC voltage, double the insulating DC voltage and even four times the insulating DC voltage of the individual solar modules. A voltage, which is less than or, at most, equal to the insulating DC voltage of the individual solar modules is thus present between each solar module, or each connector of the solar module and the carrier unit. The solar unit is thus not grounded. The potential of the carrier unit is thus specified by the connecting point of the solar unit. As a rule, it deviates from the ground potential. The potential of the carrier unit is thus insulated with respect to the ground potential, in particular by means of one or more carrier insulator(s).

The proposed arrangement enables a series circuit of more solar modules, with identical insulating DC voltage of the solar modules, compared to an arrangement in which a carrier structure of the solar modules is grounded. This higher number of solar modules makes operation with a medium voltage power converter possible. The voltage at the DC voltage side of the medium voltage power converter can assume a voltage of more than 1.5 kV. The higher voltage of the medium voltage power converter compared to a low voltage power converter, as is used nowadays, reduces the currents with the same output for transfer. In other words, a higher output can be transferred with the same currents by means of the medium voltage power converter. If lower currents are used, the electrical energy generation losses are reduced and a solar generating unit of this kind, as well as a solar generating system of this kind, is particularly efficient owing to the lower currents and accompanying lower losses.

The application of the proposed arrangement is particularly advantageous therefore for large PV parks in the region of more than 100 MW. Very high currents result there when low voltage power converters are used. The lower currents of the proposed solar generating unit also enable the arrangement of the components of the solar generating unit at a greater distance from the grid connecting point. The AC voltage of the medium voltage power converter can be selected to be high in such a way that the losses can be negligible for transfer. Thus transmission paths between medium voltage power converter and grid connecting point of more than 1 km and even of more than 10 km can also be implemented without problems. In other words, the arrangement is particularly advantageous if the spatial distance between medium voltage power converter and grid connecting point is greater than 1 km, in particular greater than 10 km. Additional transformers can be omitted for spanning this path. In the case of a PV park with a feed-in power of more than 100 MW, this results in a reduction of a large number of costly transformers.

At the same time, the demands on the insulation resistance of the individual solar modules are low. An insulating DC voltage of the solar modules used of, for example, 1.5 kV DC, as are already currently commercially available in large numbers, is suitable for the proposed arrangement in order to implement a series circuit of solar modules, which are connected on the DC voltage side to the medium voltage power converter and on the AC voltage side generate a voltage in the medium voltage range. In addition to the high level of efficiency, the omission of a higher insulation resistance of the solar modules due to the proposed arrangement simultaneously makes the proposed solution particularly inexpensive. Furthermore, cables can also be used for forming the series circuit in that the cables connect the connectors of the solar modules to the series circuit. The cables used in this case only have to be designed for a DC voltage in the low voltage range, in particular for a DC voltage up to 1.5 kV. The costly use of medium voltage cables, cables with an insulation resistance of more than 1.5 KV therefore, can be omitted.

The invention is based, inter alia, on the recognition that it is advantageous to insulate the carrier unit of the solar module with respect to the ground potential. In other words, the solar module is arranged and operated in the insulated mode, which can also be referred to as the floating mode. The supports, on which the carrier unit can be mounted and which fix the carrier unit in its spatial position, can advantageously be implemented at least partially by a medium voltage insulator. In other words, the carrier insulator is formed by a medium voltage insulator. Depending on the output range of the solar unit, the solar group unit, the solar generating unit and/or the solar generating system that is to be covered, it has proven to be advantageous to use medium voltage insulators, which are suitable for insulation between 1.5 kV DC and 50 kV DC. The cables used, both for producing the series circuit inside solar unit and for connection of the series circuits of different solar units, only require an insulation resistance in the low voltage range, such as 1.5 KV DC.

It is advantageously likewise possible to arrange a plurality of solar group units in a parallel circuit and to connect them to exactly one medium voltage power converter for this parallel circuit. The solar group units are connected on the DC voltage side of the medium voltage power converter. Owing to the current strength and the demands on the insulation, power busses, in particular, also referred to as busbars, which are isolated from the ground potential on further insulators and are optionally also fixed to them, are suitable for connection of the solar group units to a parallel circuit. In order to differentiate these other insulators, this insulator will be referred to as a busbar insulator. It has the advantage that no medium voltage cables are necessary for direct currents and yet particularly simple and inexpensive assembly can be achieved. These busbar insulators are then preferably designed as medium voltage insulators. They have an insulating voltage of more than 1.5 kV DC.

A laborious conversion of a low voltage into a medium voltage, for example for low-loss transfer to the grid connecting point, in particular to a grid connecting point more than 1 km away, can be omitted since the solar units in the proposed arrangement are already connected to the medium voltage power converter. A low-loss transfer to the grid connecting point is thereby also particularly economically possible for connections above 1 km in length, in particular above 10 km in length.

The solar units are designed in such a way that due to the solar modules of the series circuit of a solar unit, a voltage of 3 kV at most can be generated to be able to use the corresponding insulators particularly advantageously. Only insulators with an insulating DC voltage of up to 3 kV are then required between the carrier units of different solar units.

It has proven to be particularly advantageous for the control and/or regulation of the medium voltage power converter if a transformer of the solar generating system electrically isolates the connectors of the medium voltage power converter and the connectors of the grid connecting point from one another. For this, the transformer is connected to the medium voltage power converter by a first winding and to the grid connecting point by a second winding. Electrical isolation is achieved between the solar group unit and the power grid as a result. No, or at least only small, jumps in potential occur in the solar generating unit and its components thereby.

Use of the medium voltage power converter makes the proposed arrangement particularly efficient compared to known solutions with low voltage power converters since the medium voltage power converter can replace a plurality of low voltage power converters. Use of a transformer, which serves to increase the output voltage of the low voltage power converters to a medium voltage level, is likewise omitted. In general, due to the use of the medium voltage power converter and the accompanying higher voltage, the currents become smaller with the same output or the efficiency of solar generating units of this kind or solar generating systems of this kind increases with the same currents. This results in lower operating costs for plant of this kind. In total a solar generating unit of this kind or a solar generating system of this kind has far fewer components than known plants, in particular plants with an output in the region of more than 100 MW. The proposed solar generating units and -systems are therefore particularly compact, have a low maintenance requirement and, owing to a small number of components, are characterized by high availability. Despite the use of a medium voltage power converter, the proposed arrangement means a large number of low voltage components can be used, such as solar modules and cables, which can be configured as low voltage components.

In an advantageous embodiment of the invention, the connecting point is centrally arranged with regard to the solar modules of the series circuit. With the central arrangement of the connecting point it is possible for the maximum voltage of 3 kV to be generated between the first connector and the second connector of the solar module. The solar modules of the solar unit can thereby be utilized particularly economically. Even with lower utilization of the voltage, for example due to a smaller number of solar modules in the series circuit, the advantage that a lower voltage, which has to be insulated, is present between the first connector or the second connector of the solar unit and the carrier unit results. The life, inter alia, of the solar unit is thereby increased and it is freer of contamination which can reduce the insulation resistance of the insulator. Damage due to defective insulation is much less likely thereby. This applies to the insulators between the carrier units as well as to the carrier insulators to which the carrier unit is fixed and insulated with respect to the ground potential.

A central arrangement of the connecting point should be taken to mean that the same number of solar modules is arranged between the connecting point and the first connector as between the connecting point and the second connector. A central arrangement is also given with an odd number of solar modules of the series circuit if the number of solar modules between the connecting point and the first connector and the number of solar modules between the connecting point and the second connector differ by one solar module.

BRIEF DESCRIPTION OF THE DRAWING

The invention will be described and explained in more detail below with reference to the exemplary embodiments represented in the figures. In the drawings.

DETAILED DESCRIPTION OF PREFERRED EMBODIMENTS

Figures 1, 2:
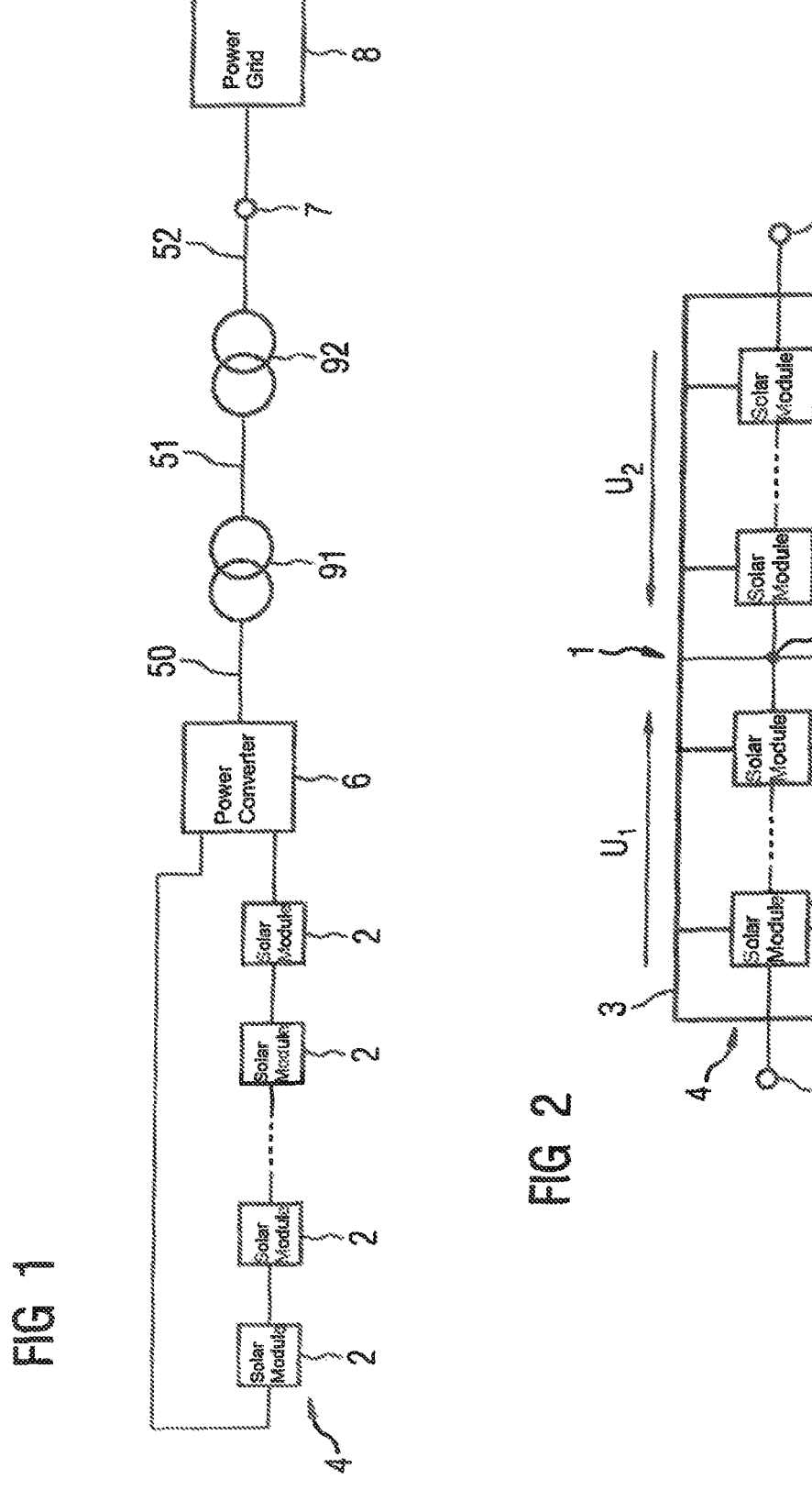
FIG. 1 shows the elements of a solar plant.
FIG. 2 shows a solar unit.

FIG. 1 shows the basic construction of a known solar plant for generating electrical power from solar modules 2. The solar modules 2 are arranged in a series circuit 4. The series circuit 4 is connected to the DC voltage side of the power converter 6. The AC voltage generated at the output by the power converter 6 can be transferred, for example via a low voltage cable 5, to a first transformer 91. This can generate a medium voltage with which the generated power can then be transported using medium voltage cables 51 with low loss even over long distances. A second transformer 92 is present at the grid connecting point 7, at which the electrical power is fed into a power grid 8, and this converts the medium voltage into a voltage of the power grid 8. Power is customarily transferred in the power grid 8 via high voltage lines 52.

FIG. 2 shows a solar unit 1. Between a first connector 41 and a second connector 42 of the solar unit 1, the solar unit 1 has a series circuit 4 of solar modules 2. At their solar module connectors, at which the electrical output generated from sunlight is available, the solar modules 2 are arranged in a series circuit. A connecting point 45 is arranged between two of the solar modules 2 of the series circuit 4. The solar modules 2 are arranged in, at or on a carrier unit 3. The carrier unit 3 is embodied to be at least partially electrically conductive and is electrically connected to the connecting point 45. A first voltage $U_1$ can be generated between the first connector 41 and the connecting point 45 and a second voltage $U_2$ can be generated between the second connector 42 and the connecting point 45.

Figure 3:
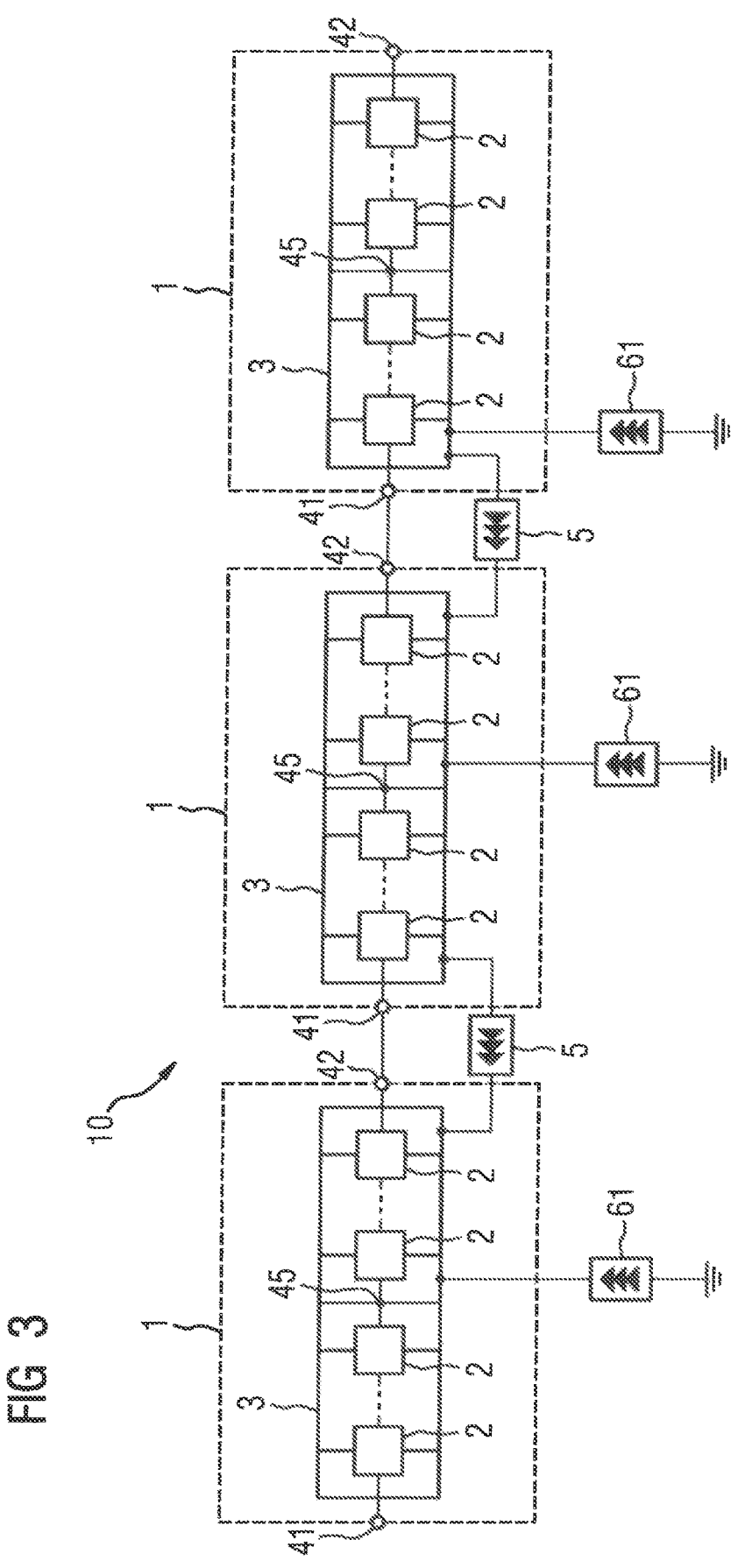
FIG. 3 shows a solar group unit.

Two or more solar units 1 can be arranged electrically in series. These solar units 1 arranged in series produce a solar group unit 10. FIG. 3 shows a solar group unit 10 of this kind. To avoid repetitions, reference will be made to the description relating to FIGS. 1 and 2 and to the reference numerals introduced there. The carrier units 3 of the individual solar units 1 are insulated from one another by insulators 5. Furthermore, the carrier units are each insulated from the ground potential by means of a carrier insulator 61.

Figure 4:
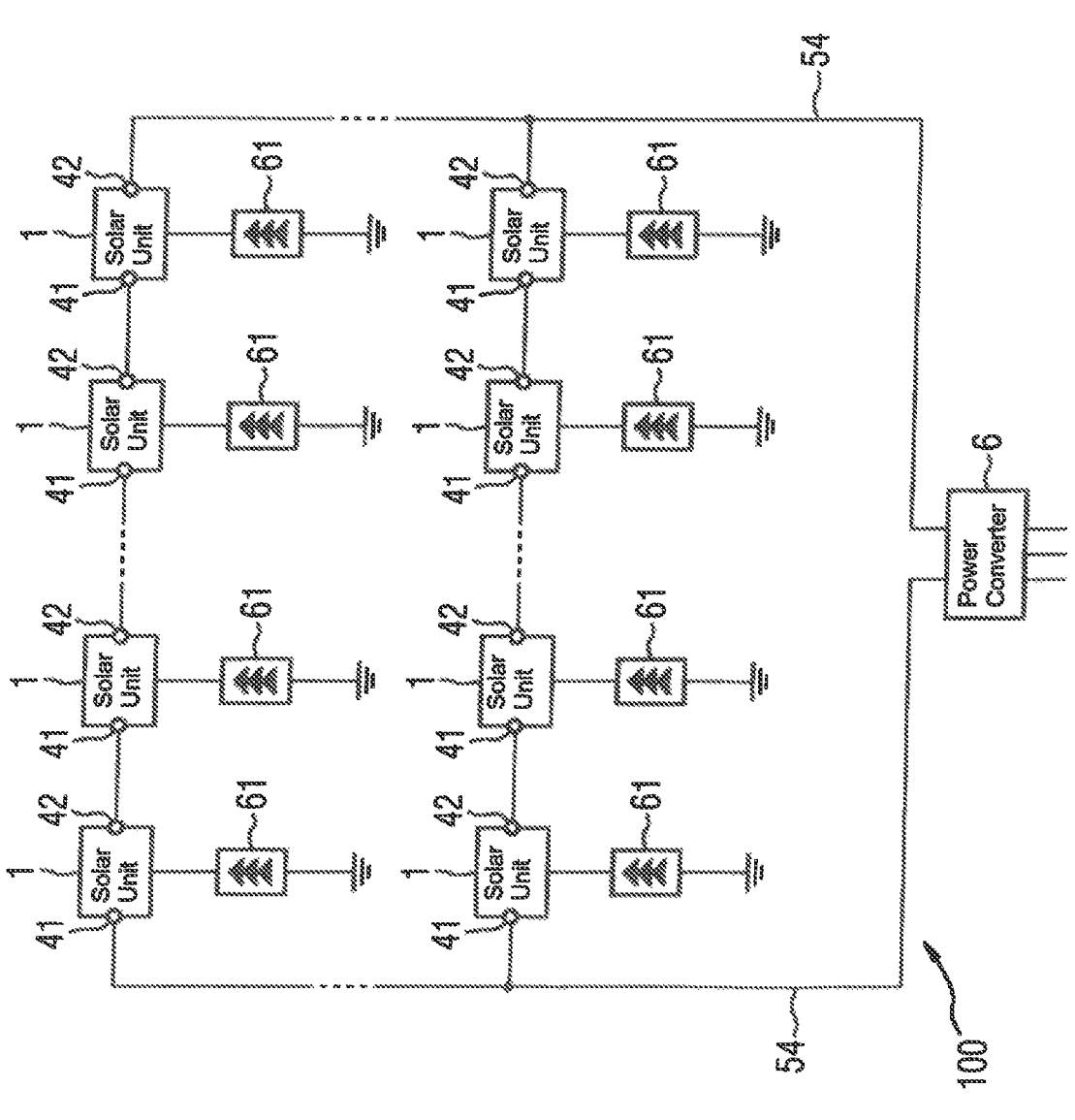
FIG. 4 shows a solar generating unit.

This solar group unit 10 is connected at the connectors of the solar units 1 arranged in series to a power converter 6 by means, for example, of a medium voltage busbar 54, with the power converter 6 being embodied as a medium voltage power converter. FIG. 4 shows an arrangement of this kind. To avoid repetitions, reference will be made to the description relating to FIGS. 1 to 3 and to the reference numerals introduced there. At the DC voltage side of the power converter 6, the power converter is connected to the solar modules 2 of the solar group unit 10. Only one solar group unit 10 can be connected to the power converter 6. Alternatively it is possible that a parallel circuit of two or more, at least two therefore, solar group units 10 is connected to the DC voltage side of the power converter 6. For reasons of clarity, representation of the insulators 5 between the solar units 1, which, according to FIG. 3, can also be arranged in this exemplary embodiment and electrically insulate the carrier units 3 of the individual solar units 1 from one another, has been omitted. As an alternative to isolation by means of the insulators, the insulation can also be provided by a sufficiently large spacing of the carrier units 3 if they are arranged without contact with one another.

Figure 5:
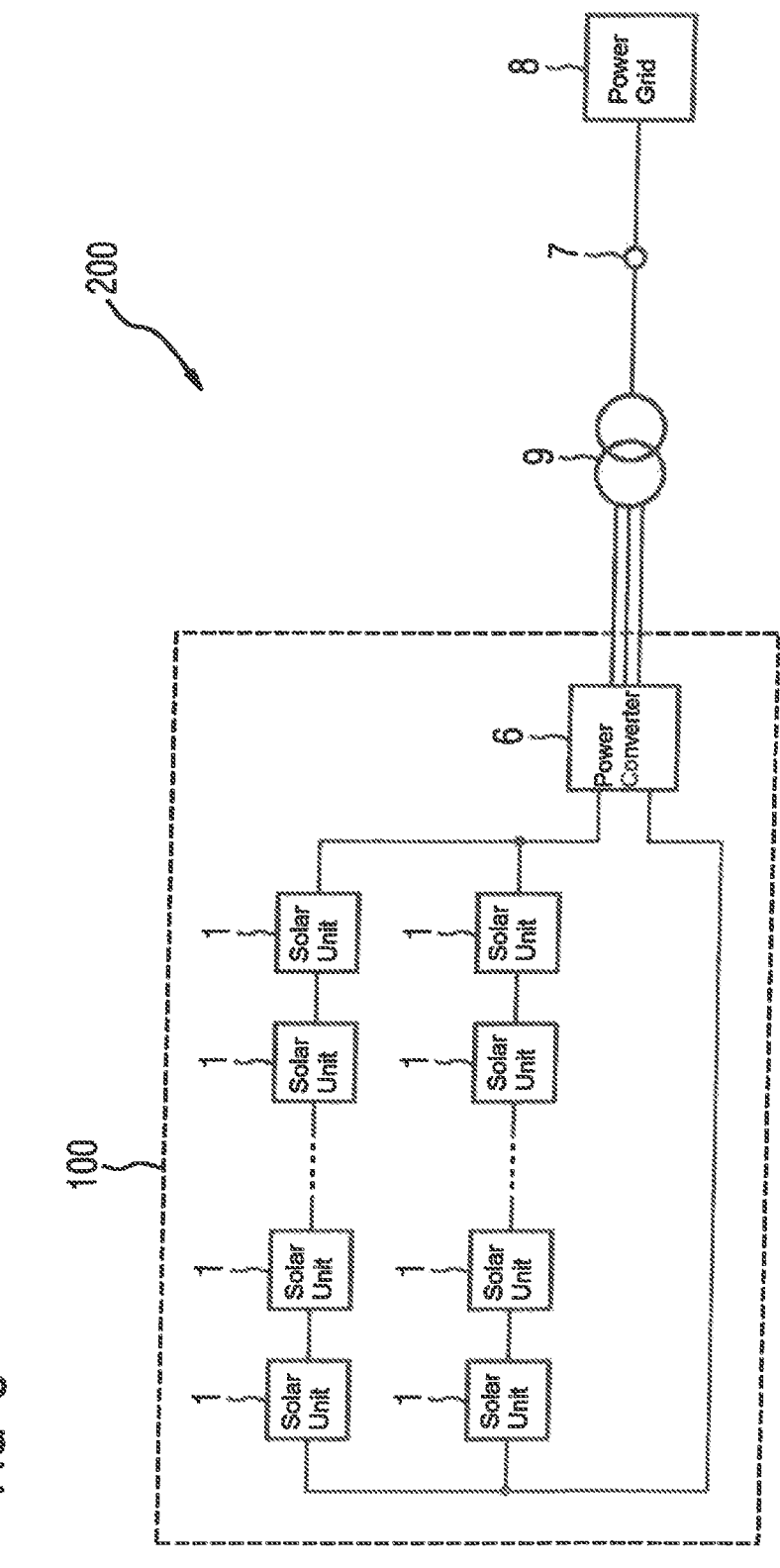
FIG. 5 shows a solar generating system.

FIG. 5 shows a solar generating system 200 with a solar generating unit 100, a transformer 9 and a grid connecting point 7 as access to a power grid 8. To avoid repetitions, reference will be made to the description relating to FIGS. 1 to 4 and to the reference numerals introduced there. Since it is a voltage in the medium voltage range, the AC voltage generated by the power converter 6 can be transported in a particularly low-loss manner, and thereby economically, even over longer distances, such as more than 1 km, in particular also over more than 10 km, to a transformer 9, which is situated in the surroundings of the grid connecting point 7. This transformer 9 adjusts the medium voltage generated by the medium voltage power converter 6 to the voltage level of the power grid 8. For this, the transformer 9 is connected to the power converter 6 by a first winding and to the grid connecting point 7 by a second winding. As a result, electrical isolation between the solar group unit 100 and the power grid 8 is achieved. With this arrangement the electrical power generated in the solar modules 2 can be fed into the power grid 8 particularly economically by means of the proposed construction using a medium voltage power converter 6.

Figures 6, 7:
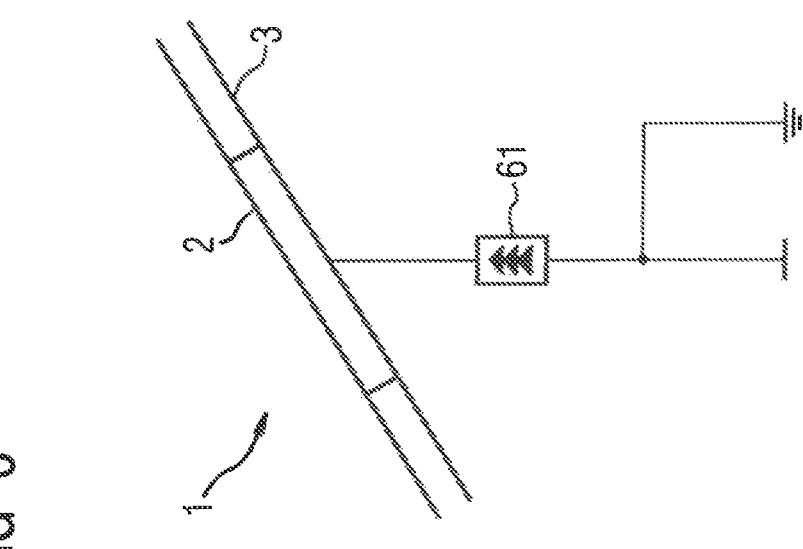
FIG. 6 shows a fixing of elements of a solar unit.
FIG. 7 shows a fixing of the busbars.

FIG. 6 shows the mechanical construction of the solar module 2 and carrier unit 3 components of a solar unit 1. To avoid repetitions, reference will be made to the description relating to FIGS. 1 to 5 and to the reference numerals introduced there. The carrier unit 3 serves for attachment of the housing of the solar module 2. The carrier unit 3 is insulated from the ground potential, for example, by means of a carrier insulator 61. The electrical potential of the carrier unit can be predefined independently of the ground potential thereby. The insulator can be arranged at a height that it cannot be touched by individuals in order to thereby ensure protection against contact. The lower part of this carrier can then be grounded and satisfies the demands on the protection against contact. The carrier insulator 61 is arranged at a particular height which depends, inter alia, on the voltage present at the carrier unit 3 during operation. The protection against contact of the part of this arrangement isolated from the ground potential, which also comprises the carrier unit, is then ensured owing to a sufficient height of this arrangement.

The medium voltage busbar 54 can also be protected against contact in the same way by arranging it at a sufficient height on a carrier. FIG. 7 shows an exemplary embodiment of this. To avoid repetitions, reference will be made to the description relating to FIGS. 1 to 6 and to the reference numerals introduced there. The lower part of the carrier can be grounded for reasons of protection against contact and a busbar insulator 62, which isolates the medium voltage busbar 54 from the ground potential, is only arranged on a part of the carrier which can no longer be reached. The electrical connection between the medium voltage busbar 54 the solar modules 2 (not represented here) of the solar units 1 or solar group units 10 can be configured for low voltage and be embodied, for example, as a low voltage cable 50.

To summarize, the invention relates to a solar group unit 10 having at least two solar units 1 with a first connector 41 and a second connector 42 respectively, wherein the solar units 1 have a large number of solar modules 2 and a carrier unit 3 respectively, wherein in respect of their insulation resistance, the solar modules 2 have an insulating DC voltage, in particular an insulating DC voltage of up to 1.5 kV DC, wherein the solar modules 2 are arranged in a series circuit 4 between the first connector 41 and the second connector 42, wherein a connecting point 45 is arranged on an electrical connection between two of the solar modules 2 arranged in the series circuit 4 in such a way that the value of a first voltage U; which can be generated by the solar modules 2 arranged between the first connector 41 and the connecting point 45 and the value of a second voltage $U_2$ which can be generated by the solar modules 2 arranged between the second connector 42 and the connecting point 45 is in each case smaller than the insulating DC voltage, wherein the solar modules 2 are arranged in or on the carrier unit 3, wherein the carrier unit 3 is embodied to be at least partially electrically conductive and is electrically conductively connected to the connecting point 45, wherein the solar units 1 are arranged electrically in series in respect of their first connectors 41 and second connectors 42. To improve the solar group unit it is proposed that the carrier units 3 of the respective solar modules 2 are arranged so as to be electrical insulated from one another by means of an insulator 5.

What is claimed is:

1. A solar group unit, comprising:
at least two solar units, each of the at least two solar units comprising a first connector, a second connector, a carrier unit, and a plurality of solar modules arranged in or on the carrier unit and having an insulation resistance with an insulating DC voltage, said plurality of solar modules arranged in a series circuit between the first connector and the second connector, with a connecting point arranged at an electrical connection between two of the plurality of solar modules arranged in the series circuit in such a way that a value of a first voltage capable of being generated by solar modules of the plurality of solar modules between the first connector and the connecting point and a value of a second voltage capable of being generated by solar modules of the plurality of solar modules between the second connector and the connecting point are each smaller than the insulating DC voltage, wherein the carrier unit is embodied to be at least partially electrically conductive and electrically conductively connected to the connecting point, and wherein the at least two solar units are arranged electrically in series in respect of the first connector and the second connector of the at least two solar units; and
an insulator embodied as a component and electrically insulating the carrier unit of one of the at least two solar units and the carrier unit of another one of the at least two solar units from one another.

2. The solar group unit of claim 1, wherein the insulator has an insulating voltage which is greater than or equal to double the insulating DC voltage of the plurality of solar modules.

3. The solar group unit of claim 1, wherein the insulating DC voltage of the insulation resistance of the plurality of solar modules is up to 1.5 kV DC.

4. The solar group unit of claim 1, wherein the connecting point is arranged centrally with regard to the plurality of solar modules of the series circuit.

5. A solar generating unit, comprising:
a power converter embodied as a medium voltage power converter and having a DC voltage side and an AC voltage side; and
the solar group unit of claim 1, wherein the at least two solar units and/or the solar group unit is electrically connected to the DC voltage side of the power converter.

6. A solar generating system, comprising:
the solar generating unit of claim 5;
a grid connecting point for connection of the solar generating unit to a power grid; and
a transformer connected to the AC voltage side of the power converter and to the grid connecting point.

7. A method for feeding in electrical power, the method comprising feeding electrical power generated by solar modules of a solar unit of the solar group unit of claim 1 into a power grid via an AC voltage in a medium voltage range.

* * * * *